(12) United States Patent
Hill et al.

(10) Patent No.: US 10,544,991 B2
(45) Date of Patent: Jan. 28, 2020

(54) HEAT EXCHANGERS

(71) Applicant: HS Marston Aerospace Limited, Wolverhampton (GB)

(72) Inventors: Mark F. Hill, Lichfield (GB); Robert J. Housely, Telford (GB)

(73) Assignee: HS MARSTON AEROSPACE LTD., Wolverhampton (GB)

( * ) Notice: Subject to any disclaimer, the term of this patent is extended or adjusted under 35 U.S.C. 154(b) by 0 days.

(21) Appl. No.: 15/197,956

(22) Filed: Jun. 30, 2016

(65) Prior Publication Data

US 2017/0003081 A1 Jan. 5, 2017

(30) Foreign Application Priority Data

Jun. 30, 2015 (GB) .................................. 1511489.5

(51) Int. Cl.
| | | |
|---|---|---|
| *F28D 9/00* | (2006.01) | |
| *F28F 3/02* | (2006.01) | |
| *B23P 15/26* | (2006.01) | |

(52) U.S. Cl.
CPC ............ *F28D 9/0093* (2013.01); *B23P 15/26* (2013.01); *F28F 3/022* (2013.01)

(58) Field of Classification Search
CPC .... F28D 1/0308; F28D 9/0031; F28D 9/0037; F28F 3/022; F28F 3/042; F28F 3/044; F28F 3/08; F28F 2225/04; F28F 2275/04; F28F 2280/04; F28F 2275/143; Y10T 29/49393; B23K 1/0012; B23K 2101/14
USPC .................................................. 228/183, 258
See application file for complete search history.

(56) References Cited

U.S. PATENT DOCUMENTS

| | | | | |
|---|---|---|---|---|
| 3,979,042 A | * | 9/1976 | Peters | B23K 1/0012 228/183 |
| 4,762,173 A | * | 8/1988 | Blakely | F28F 1/124 165/170 |
| 4,771,826 A | * | 9/1988 | Grehier | F28D 9/0037 165/166 |
| 4,858,685 A | | 8/1989 | Szuecs et al. | |
| 5,655,600 A | * | 8/1997 | Dewar | F28D 9/0062 165/166 |
| 5,829,514 A | | 11/1998 | Smith et al. | |
| 6,220,497 B1 | * | 4/2001 | Benz | B01J 19/0093 228/118 |
| 6,378,604 B1 | | 4/2002 | Feind et al. | |
| 6,622,786 B1 | * | 9/2003 | Calmidi | F28F 3/022 165/122 |

(Continued)

FOREIGN PATENT DOCUMENTS

| | | |
|---|---|---|
| CN | 201563336 U | 8/2010 |
| JP | 2012004405 A | 1/2012 |

OTHER PUBLICATIONS

Fillet (mechanics)—Wikipedia, the free encyclopedia.pdf.*

(Continued)

*Primary Examiner* — Jianying C Atkisson
*Assistant Examiner* — Jose O Class-Quinones
(74) *Attorney, Agent, or Firm* — Cantor Colburn LLP

(57) ABSTRACT

A heat exchange plate for a plate heat exchanger includes a plate body having a first side and a second side opposed to the first side. A plurality of pins extends from the first side, and a plurality of recesses is formed in the second side for locating the pins of a similar heat exchange plate arranged adjacent thereto.

3 Claims, 5 Drawing Sheets

(56) References Cited

U.S. PATENT DOCUMENTS

2007/0006998 A1 1/2007 Brost
2007/0084593 A1 4/2007 Besant et al.

OTHER PUBLICATIONS

GB Search Report for Application No. GB1511489.5, dated Nov. 27, 2015; 3 pages.
European Search Report for Application No. 16177112.6-1602 dated Jan. 26, 2017, 7 Pages.

* cited by examiner

HEAT EXCHANGERS

FOREIGN PRIORITY

This application claims priority to United Kingdom Application No. GB1511489.5 filed Jun. 30, 2015, the entire contents of which is incorporated herein by reference.

TECHNICAL FIELD

The present disclosure relates to heat exchangers, in particular to laminate heat exchangers.

BACKGROUND

A laminate heat exchanger typically comprises a plurality of plates which are spaced from one another by a plurality of pins extending from the plates to form a plurality of passages through which a fluid may flow. Heat is transferred to or from the fluid through the plate and pins which together provide a large surface area for heat transfer.

The heat exchanger is formed by forming a stack of plates and brazing the stack together. A braze is formed between the tips of the pins of one plate and a planar opposed surface of the adjacent plate. However, the stacking and brazing process may be time consuming and not produce a satisfactory braze.

This disclosure seeks to provide an improved heat exchanger and method for making a heat exchanger.

SUMMARY

From one aspect, this disclosure provides a heat exchange plate for a laminate heat exchanger, the plate comprising a plate body having a first side and a second side opposed to the first side, a plurality of pins extending from the first side, and a plurality of recesses formed in the second side for locating the pins of a similar heat exchange plate arranged adjacent thereto.

In embodiments of the heat exchange plate, the recesses may be aligned with the pins.

The recesses may be formed with a radiused edge. They may be formed with a generally planar base surface, or in an alternative arrangement, a domed base surface.

The end surfaces of the pins may be formed with a peripheral chamfer.

The radius of curvature of the peripheral chamfer may be less than, for example less than 75%, or about 67%, the radius of curvature of the radiused edge of the recess.

The pin end surface may be generally planar or, in an alternative arrangement, it may be domed.

The plate and/or pins and recesses may be configured or dimensioned such that a space is formed between the end surface of the pin and the base surface of the corresponding recess of an adjacent similar plate when the pin is fully located in the recess. In some embodiments the space may be between 0.04 and 0.06 mm deep, for example around 0.05 mm.

The pin may be formed with an external dimension which is less than the corresponding external dimension of the recess.

One or more spacers may be provided extending from the first or second side of the plate to contact the second or first side, respectively, of a similar heat exchange plate arranged adjacent thereto. The one or more spacers may extend a shorter distance from the first or second side (towards an adjacent plate) than the pins, to allow the pins to enter the recesses of an adjacent heat exchange plate.

A layer of braze material may be provided on the end surface of the pin and/or within the recess which may facilitate assembly of the plates.

The disclosure also extends to a laminate heat exchanger assembly comprising first and second heat exchange plates as described above, with the pins of the first heat exchange plate received within the recesses of the second heat exchange plate.

The assembly may further comprise a brazed joint between the pins of the first heat exchange plate and the recess of the second heat exchange plate.

The braze joint may fill a space defined between the end surfaces of the pins of the first heat exchange plate and the base surfaces of the recesses of the second heat exchange plate, and may further form a fillet between an outer wall of the pins and the adjacent side of the second heat exchanger plate.

The disclosure also extends to a method of constructing a laminate heat exchanger comprising providing a plurality of heat exchange plates as described above and assembling the heat exchange plates such that the pins of one heat exchange plate are received within the recesses of an adjacent heat exchange plate; providing a braze material between the pins and recesses of the heat exchange plates; heating the assembly to melt the braze material; and cooling the assembly to solidify the braze material to form a braze joint between the plates.

BRIEF DESCRIPTION OF DRAWINGS

An embodiment of the disclosure will now be described by way of example only with reference to the accompanying drawings in which.

DETAILED DESCRIPTION

Figure 1:
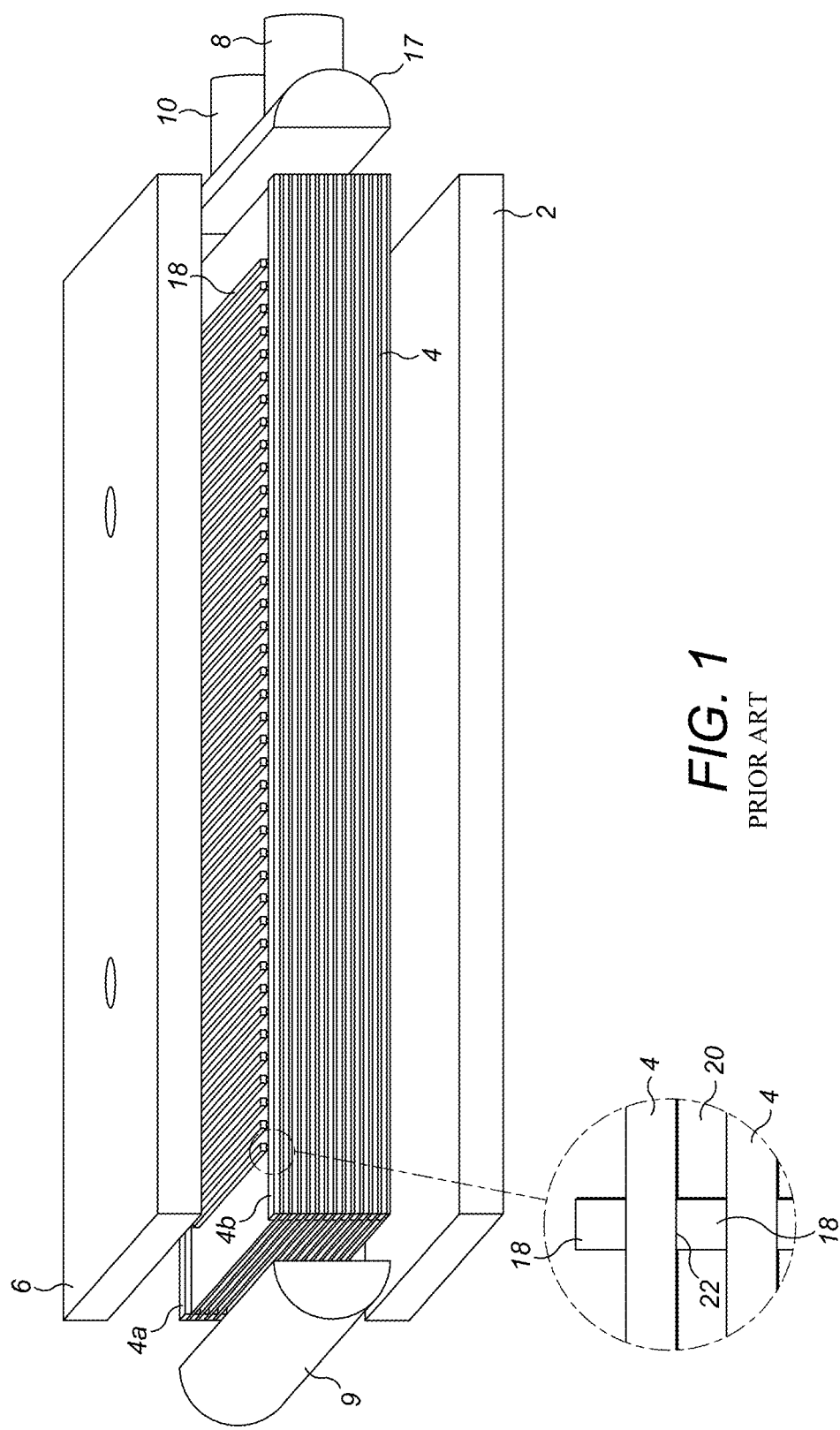
FIG. 1 illustrates, schematically an exploded view of a prior art laminate heat exchanger assembly including a detail of the assembly.
Figure 2:
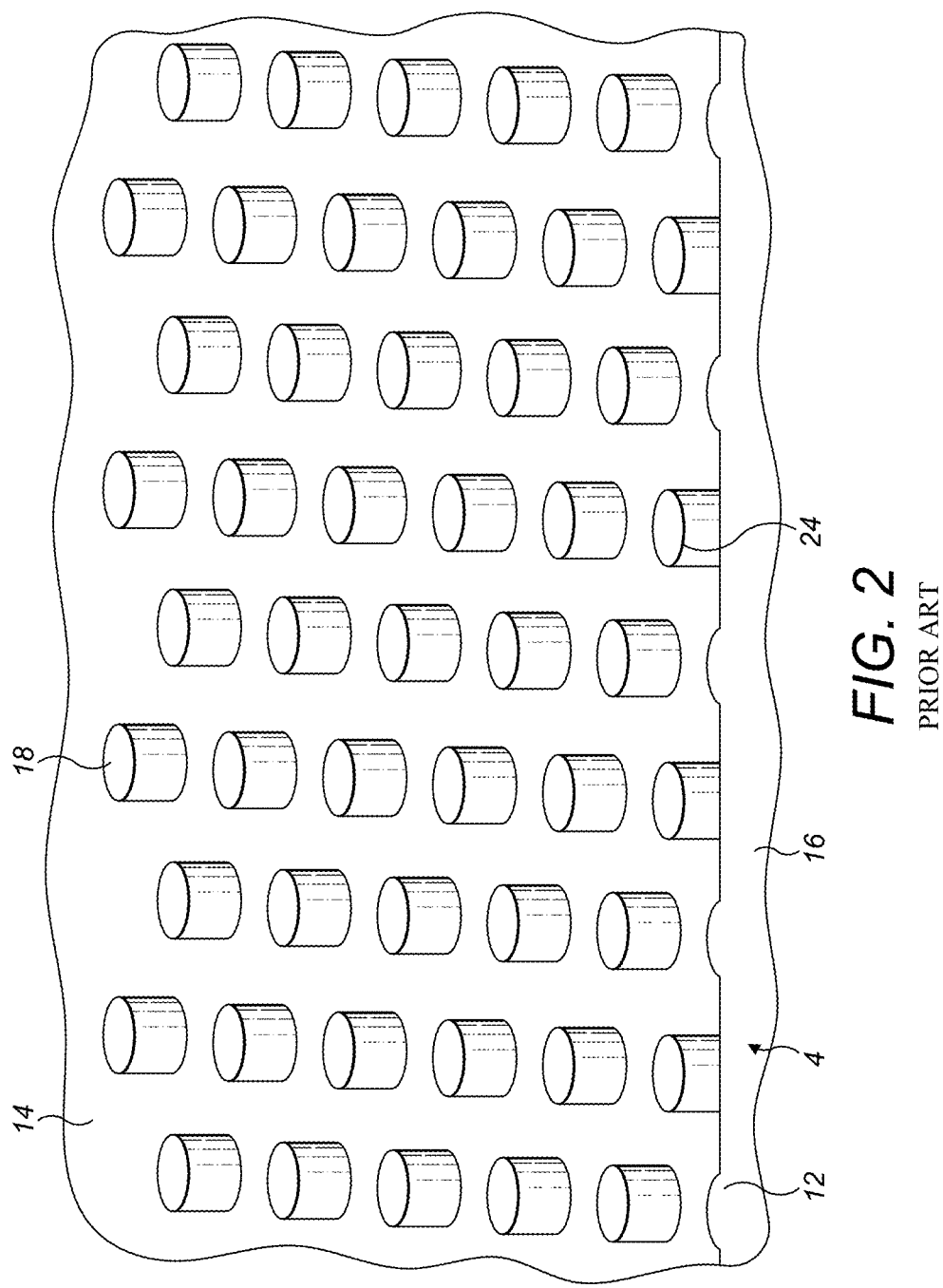
FIG. 2 illustrates schematically a plate of the heat exchanger of FIG. 1.

To assist in a better understanding of this disclosure, FIGS. 1 and 2 illustrate, respectively, a prior art laminate heat exchanger 2 and plate 4 for the heat exchanger 2.

The heat exchanger 2 is formed from a plurality of heat transfer plates 4 assembled together into a stack. The stack is mounted in a housing 6 having plenums 7, 9 at respective ends. One plenum 7 includes a fluid inlet 8 and a fluid outlet 10 and will have a suitable partition (for example a horizontal or vertical partition, not shown) to separate the fluid inlet 8 and fluid outlet 10 from one another. A fluid, for example air, is passed from the fluid inlet 8 across selected plates 4 to the plenum 9 from where it flows back through other selected plates 4 to the fluid outlet 10. Of course, this is just one example of laminate heat exchanger and in other constructions, the fluid inlet 8 and fluid outlet 10 may, for example, be formed at opposite ends of the housing 6.

Each heat transfer plate 4 comprises a base body 12 having a first surface 14 and an opposed, flat second surface 16. A plurality of pins 18, arranged in rows, extend from the first surface 14 of the plate 4. First and second longitudinally extending spacer bars 4a, 4b extend from the first surface. The pins 18 and spacer bars 4a, 4b space the plates 4 from one another to form a plurality of channels 20 between adjacent plates 4. The fluid, for example air, is passed through the channels 20 from the inlet 8 to the outlet 10 and heat is transferred to or from the fluid by the plates 4 and pins 18. The number, size and spacing of the plates 4 and the number of pins 18 will depend on the intended application. For example, the heat exchanger 2 may comprise forty or more plates 4 in certain embodiments.

A braze 22 is provided between the ends 24 of the pins 18 of one plate 4 and the second surface 16 of the adjacent plate 4 and attaches the plates 4 together.

However, the braze 22 may not provide an entirely satisfactory joint between the plates 4, particularly if, as is common, the fluid is admitted into the housing 6 at high pressure, thereby forcing the plates 4 apart and placing the brazes 22 under a tensile force. Also, it may be time consuming to assemble the plates 4 accurately for brazing.

The laminate heat exchanger and laminate heat exchanger plate disclosed herein may mitigate these problems.

Figure 3:
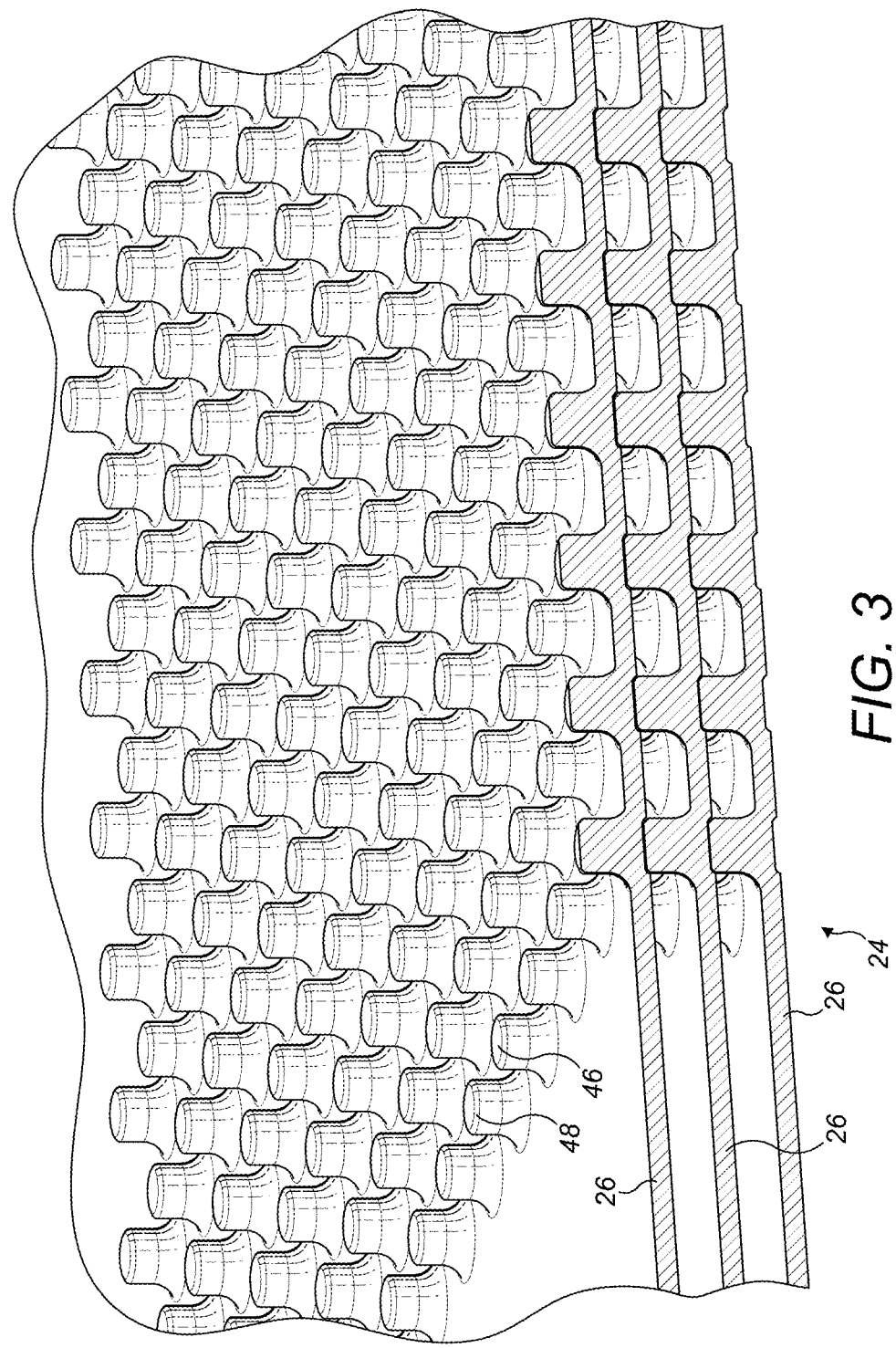
FIG. 3 illustrates schematically a section of a laminate heat exchanger in accordance with this disclosure.
Figure 4:
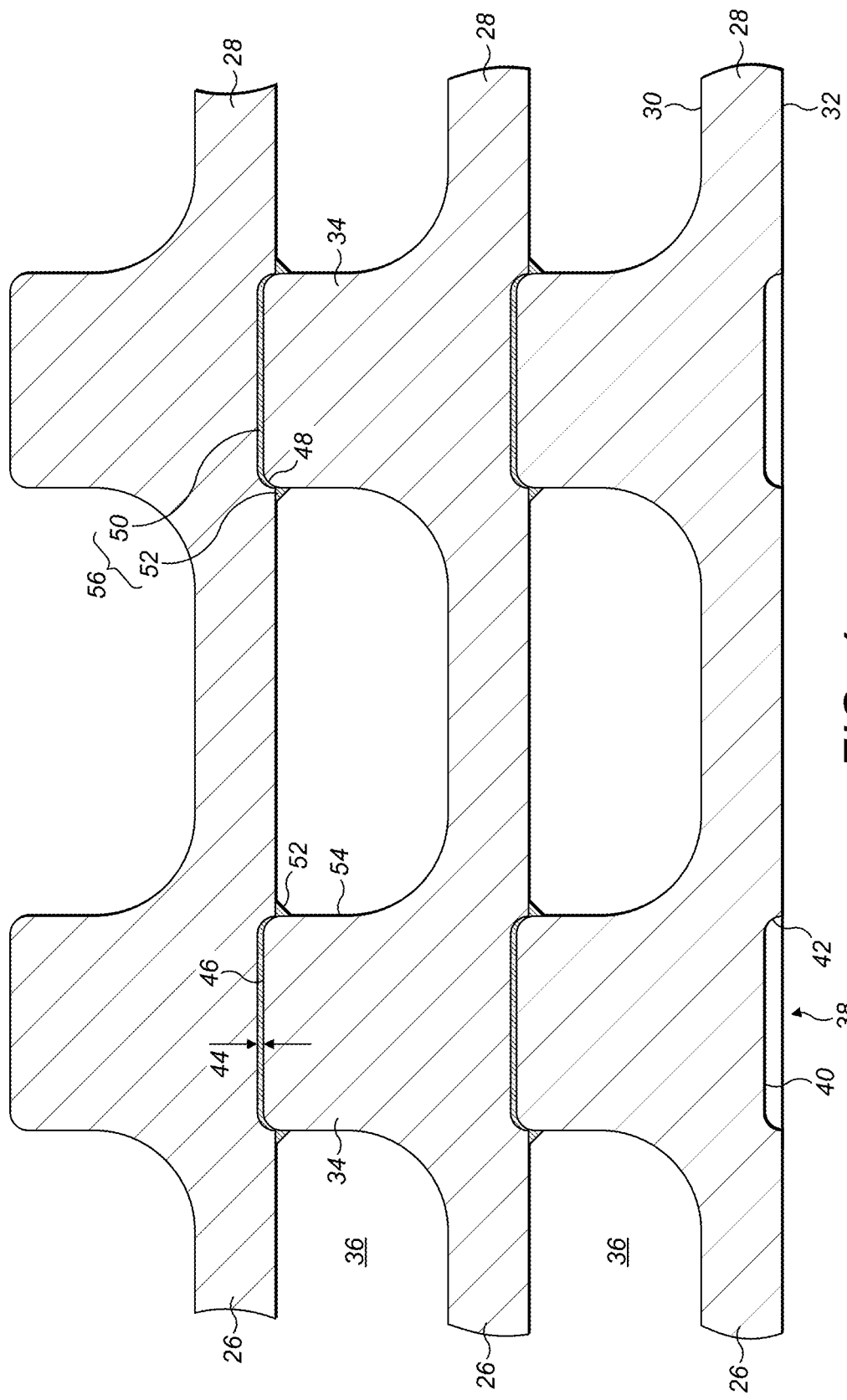
FIG. 4 illustrates a detail of the heat exchanger of FIG. 3.
Figure 5:
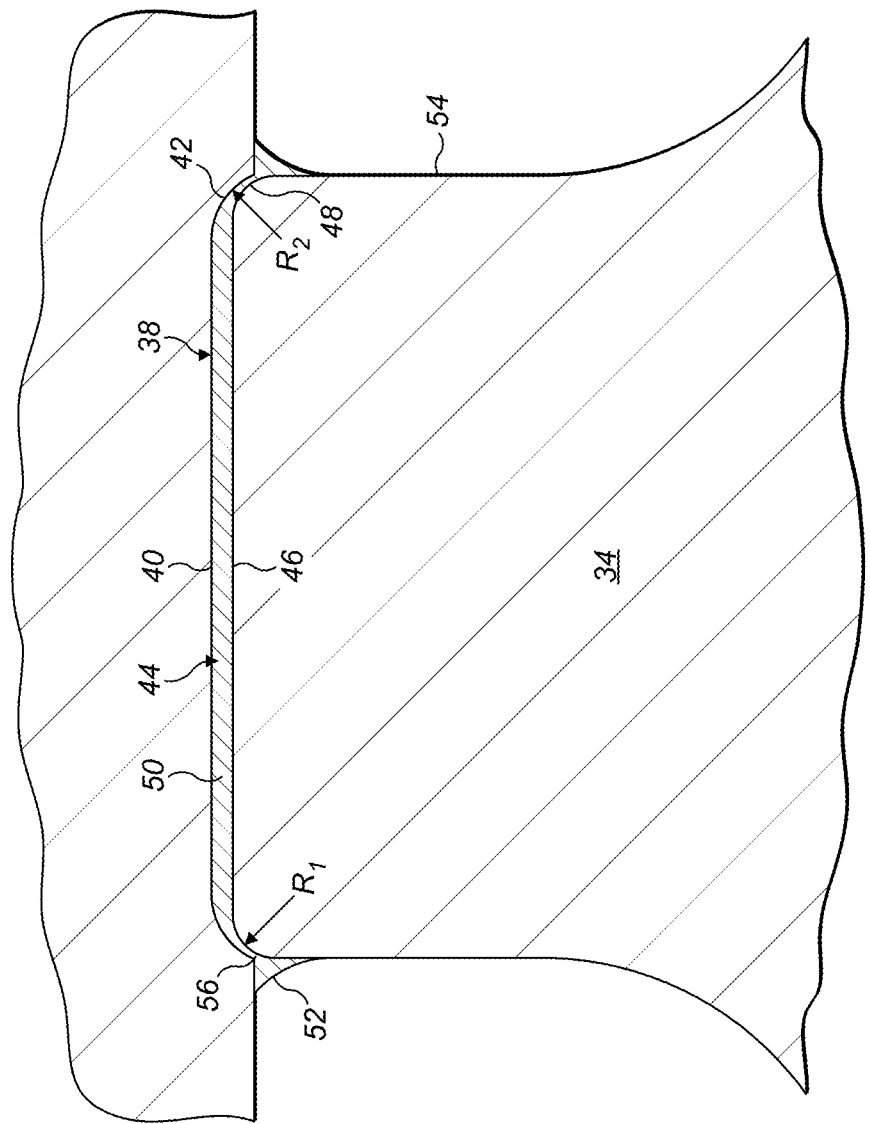
FIG. 5 illustrates a detail of FIG. 4.

Turning now to FIGS. 3 to 5, these illustrate a section 24 of a laminate heat exchanger comprising a plurality of heat exchanger plates 26 in accordance with this disclosure. The general structure of the laminate heat exchanger may be the same as that discussed above. However, there are significant differences in the construction of the heat exchanger plates 26 compared to those of the above heat exchanger 2.

Each heat transfer plate 26 comprises a plate body 28 having a first surface 30 and an opposed second surface 32. The plate body 28 may be made from any suitable thermally conductive material, for example a metallic material, for example aluminium, titanium, alloys of aluminium or titanium, stainless steel or a nickel based alloy. The material used will be dictated by the intended application of the heat exchanger.

As in the prior art arrangement discussed above, a plurality of cylindrical pins 34 extend from the first surface 30 of each plate 26 and space adjacent plates 26 from one another to form a plurality of channels 36 between the plates 26 through which in use flows a fluid.

The pins 34 in this embodiment are integrally formed with the plate body 28. The pins 34 may be formed by, for example, machining or etching the plate body 28. In alternative arrangements, the pins 34 may be formed by stamping, pressing or forging them into the plate body 28.

The pins 34 in this embodiment are circular in cross section. However, it should be noted that the pins may have any convenient cross sectional shape, for example elliptical, airfoil shaped or polygonal, for example hexagonal or diamond shaped.

The pins 34 are arranged in rows, which may be aligned or offset from one another in the direction of fluid flow.

Unlike the plates 4 of the prior art which have a flat second surface 10, the second surface 32 of the plates 26 of this disclosure are provided with a plurality of recesses 38. In the embodiment illustrated the recesses 38 are aligned with the pins 34, although this is not essential, and they may be arranged offset with respect to the pins 34. In certain embodiments, however, it may be advantageous to align the recesses 38 and pins 34 so as in effect to provide columns of pins 34 extending through the heat exchanger.

The recesses 38 are shaped and dimensioned such that the pins 34 of one plate 26 can locate within the recesses 38 of an adjacent plate 26, as illustrated in FIGS. 3 and 4. Thus, in this embodiment, the recesses 38 may be generally circular in shape, but in other embodiments, they may be generally complementary in shape to the cross-sectional shape of the pins 34. The recesses 38 each have a generally planar base surface 40 and a radiused edge 42 adjoining the adjacent second surface 32 of the plate 26.

The pins 34 are formed such that locate within the recesses 38. Thus the pins 34 may have a slightly smaller cross-sectional dimension, e.g. diameter, than the recesses 38. For example, the pin 34 may have an outer diameter which may be, for example, 0.025 to 0.075 mm smaller than that of the recess 38

The end surface 46 of each pin 34 is formed with a chamfer 48, for example a radiused chamfer 48, around its periphery. As illustrated in FIG. 5, the radius of curvature R1 of the chamfer 48 is smaller than the radius of curvature R2 of the edge 42 of the recess 38. This facilitates the location of the pin 34 within the recess 38 and may, as discussed further below, facilitate brazing of the plates 26. The radius of the chamfer 48 may, for example, be less than 75%, or about 67%, that of the recess edge 42. For example in one embodiment, the radius of the chamfer may be about 0.002 mm and the radius of the recess edge may be about 0.003 mm.

As illustrated schematically in FIGS. 4 and 5, a braze material 50 occupies a space 44 defined between the end surface 46 of each pin 34 and the base surface 40 of the corresponding recess 38. In some embodiments the space 44 is between 0.04 and 0.06 mm, for example around 0.05 mm in depth.

The extent to which the end surface 46 of pin 34 extends into recess 38 will be dictated by the thickness of braze 50 and the height of spacer bars 4a, 4b (FIG. 1) that contact adjacent plates 4.

The spacer bars 4a, 4b may extend a lesser distance from the first surface (e.g. have a smaller height) than the pins 34, so that the pins 34 extend into the recesses 38 of an adjacent plate 4.

As will be described further below, the braze material 50 also forms a fillet 52 between the side wall 54 of the pin 34 of one plate 26 and the second surface 32 of the adjacent plate 26. The braze material 50 and fillet 52 together form a braze joint 56 at each pin 34, the braze joints 56 acting to join the adjacent plates 26 together. The braze material 50 may be any suitable for the intended application, and may depend on, for example, the material of the plates 26 and the expected operating temperature of the heat exchanger.

To construct the heat exchanger, a plurality of plates 26 are assembled together such that the pins 34 of one plate 26 locate within the recesses 38 of the adjacent plate 26. This considerably facilitates the assembly as the plates 26 effectively become self-locating, obviating or minimising the need for extensive assembly jigs.

The number, size and spacing of plates 26 may be varied, depending on the particular application.

A braze material is applied between the end surface 46 of each pin 34 and the base surface 40 of each recess 38. The braze material may be pre-deposited on the end surfaces 46 of the pins 34 or into the recesses 38. For example, a layer of braze material may be coated onto the end surfaces 46 of the pins 36 or into the recesses 38. In some embodiments, a braze material may be applied one or more entire surfaces 30, 32 of the plate 26, rather than selectively on the pins 34 or in the recesses 38. The braze material may be applied using any convenient manner, for example painting or spraying. Typically the braze material may be applied to a thickness of 0.025 mm to 0.050 mm, but the thickness of the braze material may be chosen to provide a desired braze strength. For example, if a stronger braze is required, a thicker layer may be provided.

The assembled plates 26 may then be clamped together and heated in a suitable environment to melt the deposited braze material. As can be seen from FIG. 5, due to the presence of the braze material and the different radii of curvature of the pin chamfer 48 and the recess edge 42 there may be a small gap formed between the pin 34 and the recess. The braze material will melt and remain in the space 44 between the end surface 46 of each pin 34 and the corresponding recess base 40. Also, the molten braze material will be able to flow, by capillary action and pressure, through the gap around the peripheral chamfer 48 the pin 34 and along the side wall 54 of the pin, pooling to form the fillet 52 at the junction between the side wall 54 and the second surface 32 of the adjacent plate 26. This flow may be facilitated by the pin chamfer 48.

The assembly is then allowed to cool so as to form a brazed joint 56 between the pins 34 and the recesses 38. The brazed 56 joint is a robust one since it has a relatively large surface area. Braze material 50 is not only retained in the space 44 between the end surface 46 of the pin 34 and the recess base surface 40, but also extends to form a fillet 52 between the pin side wall 54 and the adjacent plate 26. Also, the space 44 provides a consistent thickness of braze material which improves the reliability of the joint 56.

The assembled plates 26 may then be suitably mounted in a heat exchanger housing.

It will be understood that the above is a description of a non-limiting embodiment of the disclosure and that modifications and changes may be made thereto without departing from the scope of the disclosure.

The invention claimed is:

1. A laminate heat exchanger assembly comprising:
   first and second heat exchange plates, the plates each comprising;
   a plate body having a first side and a second side opposed to the first side;
   a plurality of pins extending from the first side;
   a plurality of recesses formed in the second side, with the pins of the first heat exchange plate received within the recesses of the second heat exchange plate; and
   a braze joint between the pins of the first heat exchange plate and the recesses of the second heat exchange plate, wherein the braze joint fills a space formed between end surfaces of the pins of the first heat exchange plate and base surfaces of the recesses of the second heat exchange plate and wherein the braze joint further includes a fillet between an outer wall of the pins and the adjacent second side of the second heat exchanger plate;
   the recesses are formed with a radiused edge, wherein the end surfaces of the pins are formed with a peripheral fillet and wherein the radius of curvature of the peripheral fillet of the pin is smaller than the radius of curvature of the recess edge whereby a gap is formed between the radiused edge of the recess and the fillet of the pin received in the recess, which gap converges in a direction away from the recess, the gap being filled with braze material.

2. A laminate heat exchanger assembly as claimed in claim 1, wherein the radius of curvature of the peripheral fillet of the pin is less than 75% the radius of curvature of the recess edge.

3. A laminate heat exchanger assembly as claimed in claim 1, wherein the plurality recesses in the second heat exchanger are aligned with the plurality of pins of the first heat exchanger.

* * * * *